United States Patent
Brixius et al.

(10) Patent No.: US 6,976,573 B2
(45) Date of Patent: Dec. 20, 2005

(54) TRANSPORT SYSTEM FOR ARTICLES, IN PARTICULAR CONTAINERS FOR BAGGAGE PIECES, AND CONTROL METHOD FOR THE TRANSPORT SYSTEM

(75) Inventors: Wolfgang Brixius, Neunkirchen A.Br (DE); Dominik Gräfer, Nürnberg (DE); Albrecht Hoene, Lappersdorf (DE)

(73) Assignee: Siemens Aktiengesellschaft, München (DE)

( * ) Notice: Subject to any disclaimer, the term of this patent is extended or adjusted under 35 U.S.C. 154(b) by 72 days.

(21) Appl. No.: 10/721,517

(22) Filed: Nov. 24, 2003

(65) Prior Publication Data

US 2004/0104101 A1 Jun. 3, 2004

(30) Foreign Application Priority Data

Nov. 27, 2002 (DE) ................. 102 55 344

(51) Int. Cl.$^7$ .............................................. B65G 47/34
(52) U.S. Cl. .................... 198/463.3; 198/586; 198/435
(58) Field of Search ............................ 198/463.3, 586, 198/435

(56) References Cited

U.S. PATENT DOCUMENTS

| | | | | |
|---|---|---|---|---|
| 3,759,364 A | * | 9/1973 | Kornylak ..................... | 198/586 |
| 3,799,319 A | * | 3/1974 | Cutler et al. ................. | 198/416 |
| 4,867,299 A | * | 9/1989 | Fukuoka et al. ............. | 198/435 |
| 5,692,593 A | * | 12/1997 | Ueno et al. ................. | 198/369.2 |
| 5,715,930 A | * | 2/1998 | Hogenkamp ................. | 198/435 |
| 5,735,380 A | * | 4/1998 | Schneider et al. ........ | 198/347.1 |
| 5,909,796 A | * | 6/1999 | Soldavini ................. | 198/369.2 |
| 6,056,228 A | * | 5/2000 | Resch ...................... | 242/473.6 |
| 6,105,751 A | * | 8/2000 | Jentjens et al. ............. | 198/435 |
| 6,173,828 B1 | * | 1/2001 | Leu et al. ................... | 198/416 |
| 6,227,377 B1 | * | 5/2001 | Bonnet ....................... | 209/650 |
| 6,238,175 B1 | * | 5/2001 | Gotz et al. ................... | 414/795 |
| 6,390,278 B1 | * | 5/2002 | Brown .................... | 198/463.3 |
| 6,394,257 B1 | * | 5/2002 | Wheeler .................. | 198/369.6 |
| 6,499,582 B1 | * | 12/2002 | Gillott ........................ | 198/360 |
| 6,681,916 B2 | * | 1/2004 | Hiroki ....................... | 198/347.1 |
| 6,769,536 B2 | * | 8/2004 | Lutz ......................... | 198/861.1 |

FOREIGN PATENT DOCUMENTS

DE 38 06 036 A1 9/1989
WO WO 96/32205 10/1996

* cited by examiner

Primary Examiner—Gene O. Crawford
Assistant Examiner—Rashmi Sharma
(74) Attorney, Agent, or Firm—Henry M. Feiereisen

(57) ABSTRACT

A transport system for articles includes an upper conveyor and a lower conveyor, and an elevator having an elevator conveyor and movable in a vertical direction between a lower end position in which the elevator conveyor is in alignment with the lower conveyor, and an upper end position in which the elevator conveyor is in alignment with the upper conveyor. The transfer of the articles between the conveyors and the elevator conveyor is controlled by a control unit which cooperates with a signaling assembly including a first signaling member associated to one plane for indicating that the elevator has reached an upper trigger position during movement from the lower end position to the upper end position, and a second signaling member associated to the other plane for indicating that the elevator has reached a lower trigger position during movement from the upper end position to the lower end position.

12 Claims, 2 Drawing Sheets

TRANSPORT SYSTEM FOR ARTICLES, IN PARTICULAR CONTAINERS FOR BAGGAGE PIECES, AND CONTROL METHOD FOR THE TRANSPORT SYSTEM

CROSS-REFERENCES TO RELATED APPLICATIONS

This application claims the priority of German Patent Application, Serial No. 102 55 344.0, filed Nov. 27, 2002, pursuant to 35 U.S.C. 119(a)–(d), the disclosure of which is incorporated herein by reference.

BACKGROUND OF THE INVENTION

The present invention relates to a transport system for articles, in particular containers for baggage pieces. The present invention further relates to a control method for such a transport system.

Conventional transport systems for articles are known which include two or more conveyors, superposed in vertically spaced-apart planes, and an elevator, bridging the distance between the conveyors and having a horizontal elevator conveyor to form a transport path with the upper conveyor and a transport path with the lower conveyor. The articles are transferred in conveying direction of the respective transport path either from the elevator to the conveyors or, vice versa, from the conveyors to the elevator. A control unit controls the transport of the articles by operating the conveyors, when the elevator has reached the respective end positions in alignment with the conveyors. A transport system of this type has the drawback that the flow of articles is slowed down by the operation of the elevator.

It would therefore be desirable and advantageous to provide an improved transport system to obviate prior art shortcomings and to enable a high transport rate for articles.

SUMMARY OF THE INVENTION

According to one aspect of the present invention, a transport system for articles, in particular containers for baggage pieces, includes at least two conveyors disposed in vertically spaced-apart planes to define an upper conveyor and a lower conveyor, an elevator having an elevator conveyor and movable in a vertical direction between a lower end position in which the elevator conveyor is in alignment with the lower conveyor to form a lower transport path for transfer of articles from the lower conveyor to the elevator, and an upper end position in which the elevator conveyor is in alignment with the upper conveyor to form an upper transport path for transfer of articles from the upper conveyor to the elevator, and a control unit to control the transfer of the articles from the conveyors to the elevator and from the elevator to the conveyors in dependence on a vertical position of the elevator, with the control unit including a signaling assembly having a first signaling member associated to one of the planes for indicating that the elevator has reached an upper trigger position in relation to the one plane during movement from the lower end position to the upper end position, and a second signaling member associated to the other one of the planes for indicating that the elevator has reached a lower trigger position in relation to the other plane during movement from the upper end position to the lower end position.

The present invention resolves prior art problems by providing the control unit with a signaling assembly to indicate the approach of the elevator toward the upper and lower end positions of the elevator by defining predetermined trigger positions and to thereby trigger operation of the elevator conveyor, when reaching the upper and lower end positions. Thus, the elevator conveyor runs before the elevator reaches the end positions.

According to another feature of the present invention, each of the two conveyors and the conveyor of the elevator may include a continuous conveyor belt and a drive motor for operating the conveyor belt.

According to another feature of the present invention, the first and second signaling members may be configured as sensors. Examples of sensors include light barrier, light scanner, inductive sensor, and ultrasonic sensor.

According to another feature of the present invention, the control unit is constructed to initiate a movement of the articles in response to the signaling assembly, when the elevator reaches the trigger positions. In this way, the transport rate for articles is high. An even higher rate can be realized, when the upper conveyor is rendered operative by the control unit for moving the articles, when the elevator reaches the upper trigger position, and the lower conveyor is rendered operative by the control unit for moving the articles, when the elevator reaches the lower trigger position.

According to another feature of the present invention, the control unit can be constructed to initiate the movement of the articles after elapse of a predetermined delay time. Suitably, the delay time can be made dependent on a travel speed of the elevator.

According to another aspect of the present invention, a method of transporting articles, in particular containers for baggage pieces, includes the steps of providing an elevator which has an elevator conveyor and is movable between a lower conveyor and an upper conveyor which are spaced-apart in a vertical direction to thereby define a lower end position in which the elevator conveyor is in alignment with the lower conveyor to form a lower transport path for transfer of articles from the lower conveyor to the elevator, and an upper end position in which the elevator conveyor is in alignment with the upper conveyor to form an upper transport path for transfer of articles from the upper conveyor to the elevator, and controlling the transfer of the articles from the conveyors to the elevator and from the elevator to the conveyors in dependence on a vertical position of the elevator in response to an indication that the elevator has reached an upper trigger position in relation to the one plane during movement from the lower end position to the upper end position, and in response to an indication that the elevator has reached a lower trigger position in relation to the other plane during movement from the upper end position to the lower end position.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
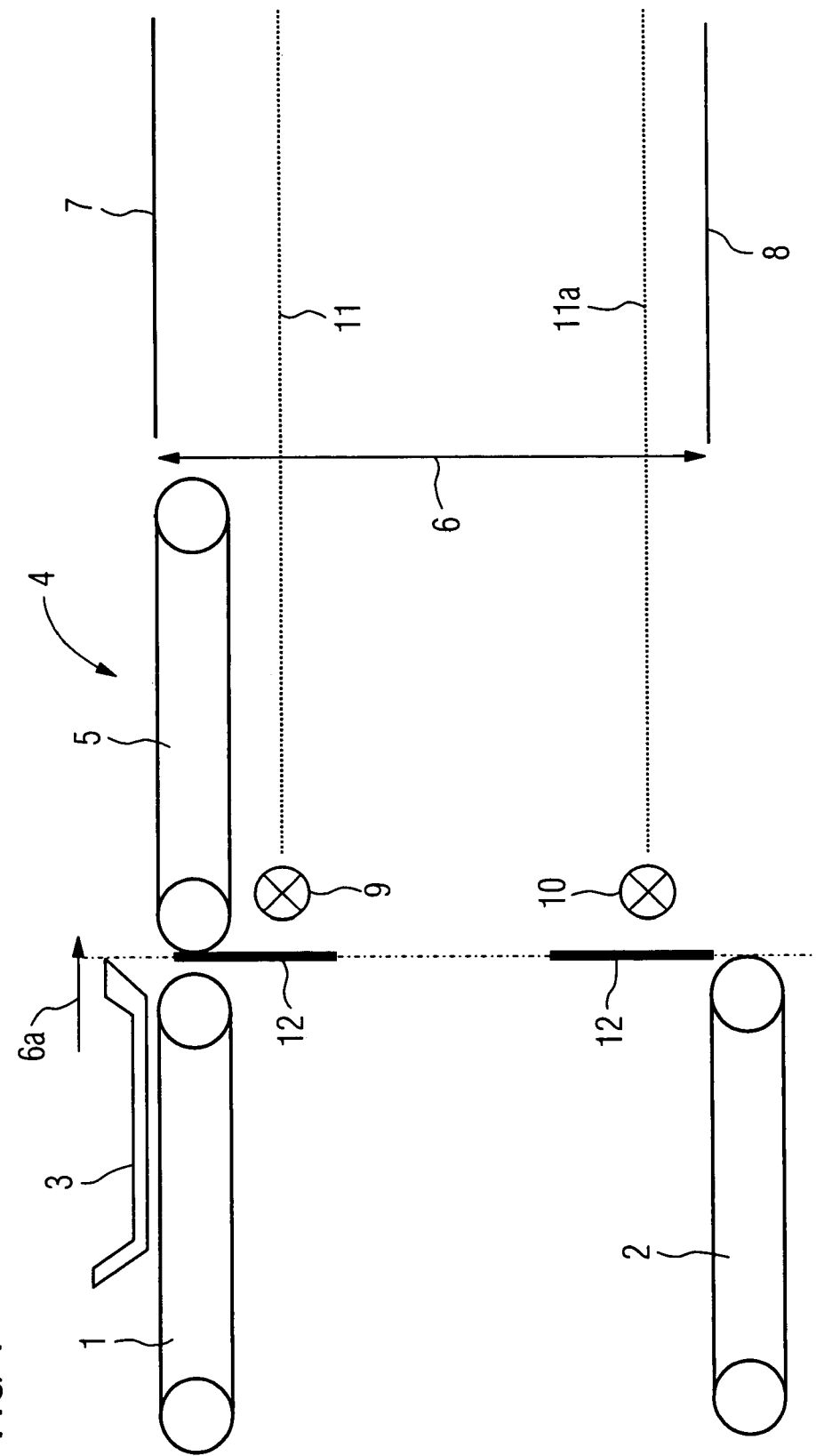
FIG. 1 is a schematic illustration of a transport system according to the present invention.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic illustration of a transport system according to the present invention, including two fixed conveyors 1, 2, which are superposed in a vertical direction in spaced-apart planes, and an elevator 4 which is disposed next to the conveyors 1, 2 (in FIG. 1 to the right of the conveyors 1, 2) and includes an elevator conveyor 5. As indicated by double arrow 6, the elevator 4 is able to shuttle between an upper end position, indicated by continuous line 7, and a lower end position, indicated by continuous line 8. The conveyors 1, 2 and the elevator conveyor 5 are each constructed in the form of an endless conveyor belt which is driven by a drive motor M for operating the conveyor belt.

Figure 2:
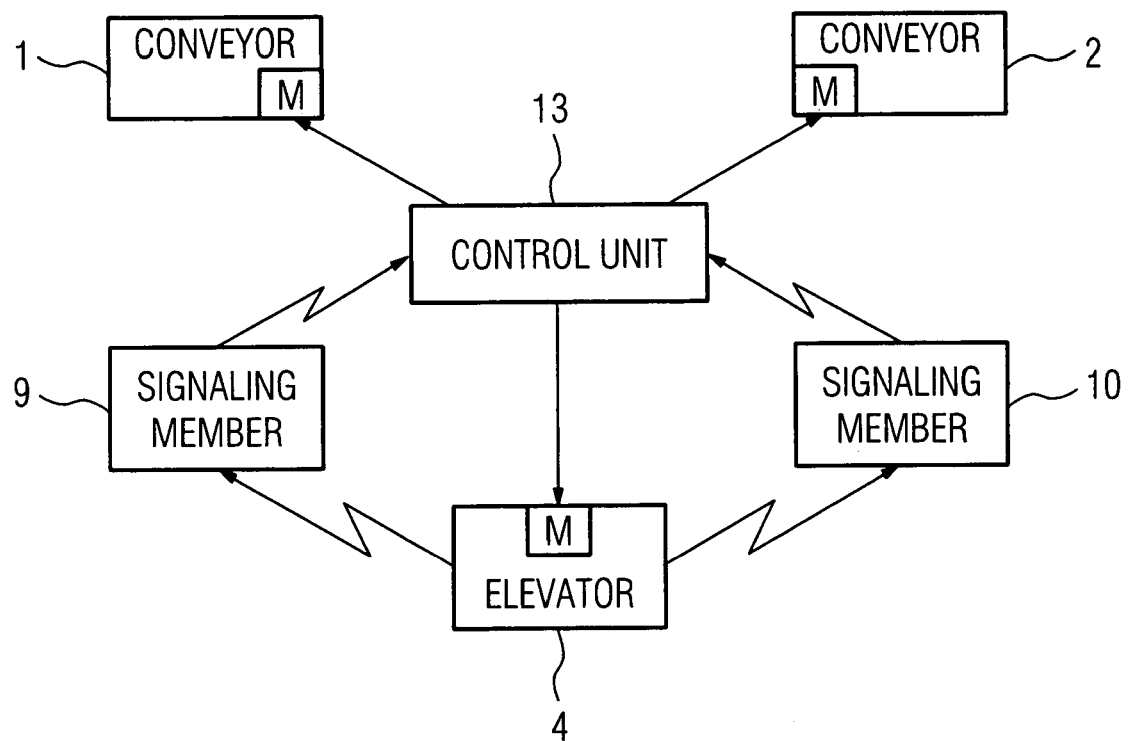
FIG. 2 is a block diagram showing the relationship and operation of the components of the transport system according to the present invention.

A control unit 13, shown in FIG. 2, is provided to control operation of the elevator 4 between the end positions 7, 8, as will be described furtherbelow.

In the upper end position of the elevator 4, the conveyor 5 of the elevator 4 is in alignment with the upper conveyor 1 and defines a transport path to allow transfer of articles 3 therebetween, and in the lower end position, the elevator conveyor 5 is in alignment with the lower conveyor 2 to define a respective transport path to allow transfer of articles 3 therebetween. Although not shown in FIG. 1, the conveyors 1, 2 may, of course, be disposed in the spaced-apart planes also in offset relationship, i.e. on either side of the elevator 4. In this case, the conveying direction of the conveyors 1, 2 remains the same, and, unlike the configuration of the transport system of FIG. 1, there is no need to reverse the conveying direction of the elevator conveyor 5.

In the exemplified illustration of FIG. 1, the elevator 4 is positioned in the upper end position 7 so that the elevator conveyor 5 forms with the upper conveyor 1 a transport path for receiving an article 3, e.g. container for baggage, from the conveyor 1. Both, conveyor 1 and elevator conveyor 5 run at about the same speed. The transport direction of the article 3 is shown by way of arrow 6a.

As the elevator 4 approaches the upper end position 7 during its ascent from the lower end position 8, the elevator 4 passes a signaling member 9 which is associated to the upper end position 7. Likewise, as the elevator 4 approaches the lower end position 8 during its descent from the upper end position 7, the elevator 4 passes a signaling member 10 which is associated to the lower end position 7. The signaling members 9, 10 are constructed as sensors in the form of a light barrier. Other types of such sensors include light scanner, inductive sensor, mechanical sensor or ultrasonic sensor. The signaling member 9 is positioned at a distance inwardly of the upper end position 7 to define a predetermined upper trigger position 11, whereas the signaling member 10 is positioned at a distance inwardly of to the lower end position 8 to define a predetermined lower trigger position 11a.

The signaling members 9, 10 are operatively connected to the control unit 13 which receives a trigger signal from the signaling members 9, 10, when the elevator 4 passes the trigger position 11 during travel from the lower end position 8 to the upper end position 7, or when the elevator 4 passes the trigger position 11a during travel from the upper end position 7 to the lower end position 8.

The operation of the transport system will now be described with reference to the example shown in FIG. 1: During ascent from the lower end position 8, operation of the conveyor 5 of the elevator 4 is suitably halted. As the elevator 4 passes the trigger position 11 in its approach to the upper end position 7, the control unit 13 activates the drive motor M of the elevator 4 to start operation of the conveyor 5, and at the same time activates the drive motor M of the conveyor 1 either immediately or after a predetermined delay time. As a consequence, the article 3 is already in motion in transport direction 6a before the elevator 4 reaches the upper end position 7 and thus can be transferred without time delay to the elevator conveyor 5, when the elevator 4 reaches the upper end position 7, whereby the elevator conveyor 5 runs at about a same speed as the conveyor 1.

When the elevator 4 has received the article 3 and has started its descent to the lower end position, the elevator conveyor 5, which transports the article 3 in horizontal direction, can be halted again. Stoppage of the conveyor 5 during movement of the elevator 4 may be realized by additional sensors (not shown) or any other suitable mechanism. When the elevator 4 passes the signaling member 10 and thus the lower trigger position 11a in its approach to the lower end position 8, the elevator conveyor 5 of the elevator 4 is started to run again. At the same time, also the conveyor 2 can be started immediately or after a predetermined delay time. In this way, a smooth transfer of the article 3 to the conveyor 2 is realized as soon as the elevator 4 reaches the lower end position 8.

The control unit 13 in conjunction with the signaling members 9, 10 thus operates in such a manner that the article 3 is transferred at the desired speed to the elevator 4 from the conveyors 1, 2, or from the conveyors 1, 2 to the elevator 4, when the elevator 4 has reached the respective end positions 7, 8.

In order to enhance the overall safety, the transport system is provided with two safety locks 12 which are actuated by the elevator 4 in dependence on the vertical position of the elevator 4 and prevent a drop of the articles 3 into the elevator shaft, when the elevator 4 has not reached the intended position. As shown in FIG. 1, the upper one of the locks 2 occupies the down position to allow the transfer of articles 3, while the lower lock 12 occupies the up position.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein.

What is claimed is:

1. A transport system for articles, in particular containers for baggage pieces, comprising:
   at least two conveyors disposed in vertically spaced-apart planes to define an upper conveyor and a lower conveyor;
   an elevator having an elevator conveyor and movable in a vertical direction along a travel path between a lower end position in which the elevator conveyor is in alignment with the lower conveyor to form a lower transport path for transfer of articles between the lower conveyor and the elevator, and an upper end position in which the elevator conveyor is in alignment with the upper conveyor to form an upper transport path for transfer of articles between the upper conveyor and the elevator; and a control unit to control the transfer of the articles from the upper and lower conveyers to the elevator and from the elevator to the upper and lower conveyors in dependence on a vertical position of the elevator, said control unit including a signaling assembly having a first signaling member rendered operative to initiate movement of the elevator conveyor, when during movement from the lower end position to the upper end position the elevator has reached an upper trigger position which is defined in the travel path below an upper one of the planes, and a second signaling member rendered operative to initiate movement of the elevator conveyor, when during movement from the upper end position to the lower end position the elevator has reached a lower trigger position which is defined in the travel path above a lower one of the planes.

2. The transport system of claim 1, wherein each of the upper and lower conveyors and the conveyor of the elevator includes an endless conveyor belt, and a drive motor for operating the conveyor belt.

3. The transport system of claim 1, wherein the first and second signaling members are configured as sensors.

4. The transport system of claim 1, wherein each of the sensors is constructed as a member selected from the group consisting of light barrier, light scanner, inductive sensor, mechanical sensor, and ultrasonic sensor.

5. The transport system of claim 1, wherein the upper conveyor is rendered operative by the control unit, when the elevator reaches the upper trigger position, and wherein the lower conveyor is rendered operative by the control unit, when the elevator reaches the lower trigger position.

6. The transport system of claim 5, wherein the control unit is constructed to initiate operation of the upper and lower conveyors after elapse of a predetermined delay time.

7. The transport system of claim 6, wherein the control unit is so constructed that the delay time is dependent on a travel speed of the elevator.

8. A method of transporting articles, in particular containers for baggage pieces, comprising the steps of:

providing an elevator with an elevator conveyor for movement along a travel path between a lower conveyor and an upper conveyor which are disposed in vertically spaced-apart planes to thereby define a lower end position in which the elevator conveyor is in alignment with the lower conveyor to form a lower transport path for transfer of articles between the lower conveyor and the elevator, and an upper end position in which the elevator conveyor is in alignment with the upper conveyor to form an upper transport path for transfer of articles between the upper conveyor and the elevator; and controlling the transfer of the articles between the upper and lower conveyors and the elevator in dependence on a vertical position of the elevator in response to a signal indicating that the elevator has reached an upper trigger position defined in the travel path below an upper one of the planes during movement from the lower end position to the upper end position, and in response to a signal indicating that the elevator has reached a lower trigger position defined in the travel path above a lower one of the planes during movement from the upper end position to the lower end position, wherein the control unit initiates movement of the elevator conveyor, when the elevator reaches the upper and lower trigger positions.

9. A method of transporting articles, in particular containers for baggage pieces, comprising the steps of:

providing an elevator which has an elevator conveyor and is movable along a travel path between a lower conveyor and an upper conveyor which are disposed in vertically spaced-apart planes to thereby define a lower end position in which the elevator conveyor is in alignment with the lower conveyor to form a lower transport path for transfer of articles between the lower conveyor and the elevator, and an upper end position in which the elevator conveyor is in alignment with the upper conveyor to form an upper transport path for transfer of articles between the upper conveyor and the elevator; and controlling the transfer of the articles between the upper and lower conveyors and the elevator in dependence on a vertical position of the elevator by starting operation of the elevator conveyor, when the elevator reaches an upper trigger position defined in the travel path below an upper one of the planes during movement from the lower end position to the upper end position, and by starting operation of the elevator conveyor, when the elevator reaches a lower trigger position defined in the travel path above a lower one of the planes during movement from the upper end position to the lower end position.

10. A transport system for articles, in particular containers for baggage pieces, comprising:

at least two conveyors disposed in vertically spaced-apart planes to define an upper conveyor and a lower conveyor;

an elevator having an elevator conveyor and movable along a travel path between a lower end position in which the elevator conveyor is in alignment with the lower conveyor for transfer of articles between the lower conveyor and the elevator, and an upper end position in which the elevator conveyor is in alignment with the upper conveyor for transfer of articles between the upper conveyor and the elevator;

a control unit to control operation of the elevator; and a signaling assembly instructing the control unit to operate the elevator conveyor, when the elevator passes during ascent to the upper end position a first predetermined trigger position before reaching the upper end position, and instructing the control unit to operate the elevator conveyor, when the elevator passes during descent to the lower end position a second predetermined trigger before reaching the lower end position.

11. The transport system of claim 10, wherein the control unit initiates operation of the upper conveyor, when the elevator passes the first trigger position, and initiates operation of the lower conveyor, when the elevator passes the second trigger position.

12. The transport system of claim 10, wherein the signaling assembly includes a first signaling member disposed in the travel path of the elevator below the upper end position to define the first trigger position, and a second signaling member disposed in the travel path of the elevator above the lower end position to define the second trigger position.

* * * * *